Feb. 19, 1952 J. C. TELLIER ET AL 2,586,119
FREQUENCY MODULATION DETECTOR
Filed May 4, 1949
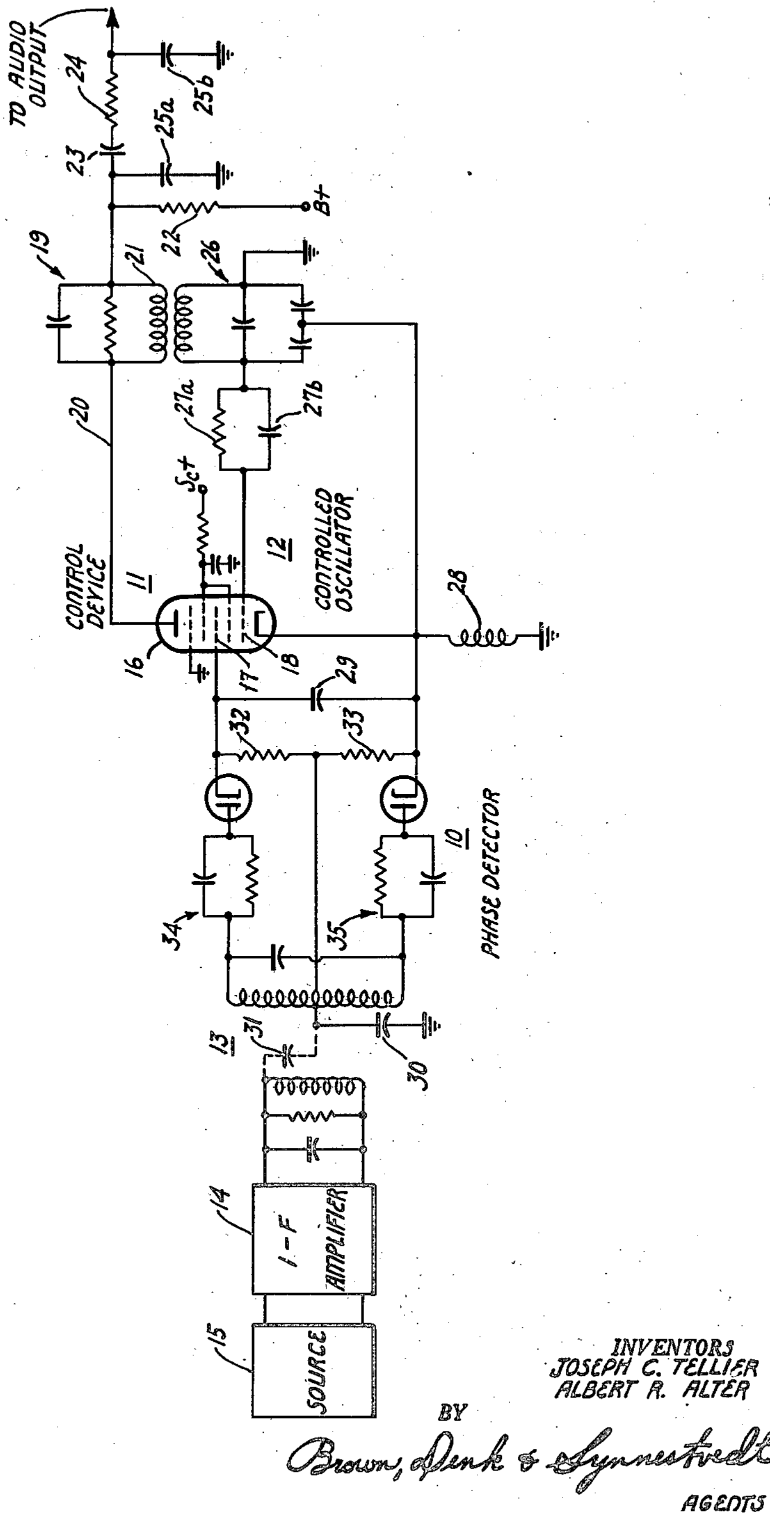
INVENTORS
JOSEPH C. TELLIER
ALBERT R. ALTER
BY
Brown, Denk & Synnestvedt
AGENTS Patented Feb. 19, 1952

2,586,119

UNITED STATES PATENT OFFICE 2,586,119

FREQUENCY MODULATION DETECTOR

Joseph C. Tellier, Penn Wynne, and Albert R. Alter, Philadelphia, Pa., assignors to Philco Corporation, Philadelphia, Pa., a corporation of Pennsylvania Application May 4, 1949, Serial No. 91,282

7 Claims. (Cl. 250—27)

The present invention relates broadly to circuit arrangements adapted for use in frequency control circuits, frequency modulation detectors, and the like, and more particularly, to circuit arrangements of this type which comprise a locked-in oscillator and which avail themselves of the inherent characteristics thereof to render the circuits substantially insensitive to most amplitude variations in the incoming signal.

More specifically, circuit arrangements constructed in accordance with the present invention constitute improvements over the arrangements disclosed in the copending application of William E. Bradley and Joseph C. Tellier, Serial Number 74,732, filed February 5, 1949, and assigned to the assignee of the present invention. In this copending application it is shown that a locked-in oscillator, as used in conjunction with frequency modulation detectors, may advantageously be controlled via a phase detector arranged to sense the phase difference between the incoming signal and the oscillator signal, and further arranged to generate a signal in response to this phase difference which, in turn, maintains the oscillator in the desired synchronism.

Ordinarily the circuit described in the above-identified copending application follows the last intermediate frequency stage of amplification, the secondary winding of the last I.-F. transformer being center-tapped and utilized as the input component of a conventional, balanced, double-diode type of phase detector. The incoming signal is applied to this phase detector by way of the mutual inductive coupling existing between the primary and secondary windings of the I.-F. transformer, and the oscillator signal which is to be utilized for phase comparison by the phase detector is applied thereto at the center tap of the transformer secondary winding in the manner conventionally adopted for the measurement of phase differences. Unfortunately, in such an arrangement, this is not the only signal which is applied to the center tap of the transformer secondary, for, due to the interwinding capacity which exists between the primary and the secondary windings of the transformer, a portion of the incoming signal is deleteriously applied to this center tap along with the oscillator signal. This simultaneous application of the incoming signal to the secondary winding through mutual induction, and to the center tap thereof through capacitive coupling, causes the phase detector to function concurrently as a discriminator, with the result that its output is not only proportional to the phase difference between the incoming signal and the oscillator signal, but is also proportional to the frequency of the incoming signal. In the type of frequency detector under discussion this is not a serious shortcoming as long as the oscillator remains synchronized. If, however, the receiver is detuned to the point where the oscillator is no longer synchronized, then the discriminator action of the phase detector will manifest itself in the audio output of the system, thus giving rise to two spurious tuning points, one on each side of the correct tuning point and characterized by considerable distortion. When the phase detector functions as a discriminator at these spurious tuning points, the audio output of the system may be of the same order of magnitude as that obtained at the desired tuning point. This spurious effect is, of course, highly undesirable from every point of view.

Efforts to overcome this difficulty have, in the past, been, quite understandably, directed at the source of the trouble, that being the capacitive coupling between the windings of the I.-F. transformer. However, these efforts principally consisted of capacitively shielding the two windings from each other, with the result that the undesirable effect was diminished, but never quite eliminated, since the shielding could not, in practice, be made perfect.

In accordance with our inventive concept, the deleterious effect hereinbefore described is overcome, not by reducing the capacitive coupling between windings, but instead by rendering this coupling innocuous, that is, incapable of causing discriminator action in the phase detector. This is accomplished, according to our invention, by grounding the center tap of the secondary winding of the I.-F. transformer to signals within the range of intermediate frequencies. In addition, the oscillator signals are now introduced, for comparison in the phase detector, not via this center tap, but via the cathodes of the associated diodes, thus giving rise to an entirely novel type of phase detector and signal injection thereto. While overcoming the defect hereinbefore described, our novel arrangement retains and, in fact, accentuates the desirable features of the prior art arrangement in the manner hereinafter set forth at length.

It is, accordingly, a principal object of our invention to provide a frequency modulation detector which is adapted to sense the phase difference between an incoming signal and a locally generated signal, and to synchronize the locally generated signal with the incoming signal.

It is another object of our invention to provide a phase detector arranged to detect the phase difference between two signals and incapable of detecting the frequency variations of one of said signals.

Still another object of our invention resides in the provision of a balanced, double-diode phase detector for comparing the phase of an incoming signal with that of a locally generated signal and for producing an output signal which is proportional to the relation between the phases of the compared signals, but unaffected by the frequency variations of one of those signals alone.

These and other objects and features of our invention will become more apparent from a consideration of the detailed discussion hereinafter presented when viewed in the light of the accompanying drawings wherein the single figure is a schematic circuit diagram illustrative of a preferred embodiment of our inventive concept.

As has been pointed out hereinbefore our invention finds its widest scope of application in connection with a frequency modulation detector of the indirectly synchronized oscillator type. The preferred form which the physical expression of our inventive concept may take when incorporated in such a circuit is illustrated in the figure to which more detailed reference is now made. There is shown a frequency modulation detector comprising, in general terms, a phase detector 10, an oscillator control device 11, and a controlled oscillator 12.

In its overall arrangement, the phase detector 10 is of the balanced double-diode type. However, the details of its construction are novel and closely related to our inventive concept, as shown in more detail hereinafter. The frequency-modulated intermediate frequency carrier is applied to this phase detector by way of the tuned primary winding of the I.-F. transformer 13 which is here shown connected to the output of the I.-F. amplifier 14, this latter, in turn, deriving its signals from a source 15. The manner in which oscillations derived from controlled oscillator 12 are simultaneously applied to this phase detector for phase comparison with the I.-F. carrier is intimately associated with our inventive concept and a full discussion thereof is consequently presented hereinafter.

The control device 11 may, in its preferred form, comprise a multi-grid tube 16, of which the cathode, control grid 17 and the plate are principally active in the role of oscillator control device 11; control grid 18, the cathode and the screen grid of the same tube 16 simultaneously perform the functions of the oscillator triode of controlled oscillator 12. Associated with the control portion of tube 16 is a radio frequency output circuit comprising the anode and the resonant plate circuit 19, and an audio frequency output circuit comprising the anode, conductor 20, inductance coil 21 (which, of course, has no effect on the audio-frequency circuit), the audio-frequency plate load resistor 22, coupling condenser 23, and the radio-frequency filter combination 24—25*a*—25*b*.

The controlled oscillator 12 comprises the triode portion of tube 16, hereinbefore described, in combination with a tank circuit 26, grid leak resistor 27*a* and grid leak bypass condenser 27*b*. The junction of the two series tank circuit condensers is returned to the cathode of tube 16, that cathode, in turn being returned to ground via a radio-frequency choke 28. It will be understood, in this connection, that the choice of a suitable controlled oscillator is largely arbitrary and only restricted by the necessity of its functioning in the manner hereinafter set forth. Thus, by making minor changes in the circuit arrangement of a nature well within the scope of anyone skilled in the art, other types of oscillators may be substituted, such as, for example, one of the conventional Colpitts or Hartley type; such substitutions are, therefore, considered within the scope of the present inventive concept. The output of this oscillator is, in this embodiment, taken off at the cathode which is shown connected directly to the cathode of one of the phase detector diodes and, via a condenser 29, to the other diode of this phase detector. This condenser is chosen with such a value of capacitance as to present, for all practical purposes, negligible impedance to signals in the intermediate frequency range; thus, effectively, the oscillator is connected directly to the cathodes of both diodes.

It is this novel oscillator connection, whereby the oscillator signal is injected into the cathodes of the phase detector diodes, which constitutes one of the principal features of the invention. Combined therewith, and of equal importance, is the novel arrangement whereby the center tap of the secondary winding of I.-F. transformer 13 is connected to ground. This ground connection is, of course, intended only for signals within the intermediate frequency range, signals at lower frequencies, and direct current, being isolated from ground by a condenser 30 of suitable capacitance. For better understanding of some features of the invention, the effective capacitance existing between the two windings of I.-F. transformer 13 which, in prior art circuits, gave rise to the undesired effects hereinbefore described, is also illustrated in the figure, where it is schematically represented by lumped capacitance 31.

The operation of the entire circuit arrangement here illustrated is partly conventional, in the sense that the phase detector 10, as usual, compares the phase of signals derived from source 15 via the mutual inductive coupling between the two windings of I.-F. transformer 13 with the phase of signals derived from oscillator 12. This phase detector provides an output component, whose magnitude is proportional to the phase difference between these two signals. The tank circuit tuning of the oscillator is so adjusted that, when an undeviated I.-F. signal is applied to the phase detector via I.-F. transformer 13, the operating frequency of the oscillator is identical with that of the undeviated I.-F. input signal, and the oscillator voltage in phase quadrature relation with the input signal. This phase relation is maintained by means of the radio frequency control voltage supplied to the oscillator by way of a so-called quadrature circuit which, in this instance, comprises the resonant circuit 19 inductively coupled to the oscillator tank circuit 26.

At this juncture it is deemed advisable to point out that, while not essential to a realization of all the features of the invention, it is preferred that the bias voltages supplied to tube 16 be of such magnitude that tube 16 operates under class C conditions. A class C mode of operation in which plate current is permitted to flow in tube 16 during only about 60° out of every 360° of each cycle has been found useful in practice. In the remainder of the discussion of the figure the description is particularly directed to the preferred class C mode of operation.

For a more detailed discussion of various ancillary features associated with the abovementioned quadrature circuit as well as for an analysis of the peculiar advantages of the preferred class C operation of tube 16, reference is made to the copending application of William E. Bradley, Serial No. 576,057, filed February 3, 1947, now U. S. Patent No. 2,494,795 dated January 17, 1950 and assigned to the assignee of the present invention.

When the frequency of the input signal shifts, the output voltage of phase detector 10 changes in accordance with the concomitant phase change, the amplitude of the R.-F. component of output from the control device 11 changes, and this change is in such a direction as to cause the frequency of oscillator 12 to follow that of the I.-F. input signal. Of course, the initial phase quadrature relation will not be maintained as the frequency of the applied carrier varies, the departure from phase quadrature being a function of the deviation of the applied carrier wave. Because of this variation about the mean quadrature relation, the phase detector 10 will supply a low frequency output voltage, the magnitude of which is proportional to the deviation of the applied carrier from its mean frequency. This low frequency output is developed across condenser 29 and is applied to control grid 17 of control device 11, as shown in the figure, where it is utilized to control the amplitude of the R.-F. component of the output of control device 11, with the results hereinbefore outlined.

In the light of the preceding general considerations, a more detailed discussion of the novel and inventive features of our circuit arrangement may now be undertaken. To begin with, it must be kept in mind that the circuit described in the above-identified copending application of Bradley and Tellier used a phase detector which was conventional in the sense that the oscillator signals were injected into it at the center tap of the secondary winding of I.-F. transformer 13. This center tap could, therefore, not be grounded to I.-F. signals, with the result that the phase detector was entirely capable of functioning as a simple frequency discriminator by virtue of the effective interwinding capacitance schematically indicated by condenser 31. Such discriminator action is too well known to require further discussion in this connection. It need, therefore, only be pointed out that this discriminator action contributed a spurious audio frequency output component which was applied to the control grid 17 of tube 16 along with the desired signal. As long as the oscillator was locked-in, this was not particularly harmful, since the audio output was in that case inherently proportional to the frequency of the oscillator 12; when, however, the receiver was sufficiently detuned to cause the oscillator to break out of synchronism with the incoming I.-F. signals, then the control device acted simply as a pronouncedly non-linear amplifier for the audio output of the phase detector with the resulting two spurious tuning points hereinbefore referred to.

An ancillary disadvantage was inherent in the use of the prior art circuit whenever the oscillator was directly coupled to the secondary winding center tap, for, in that case some of the I.-F. signals coupled to that point via the interwinding capacitance found their way into the oscillator where they had the effect of an in-phase control signal which conflicted with the desired quadrature control signal which was applied thereto via the abovementioned quadrature circuit.

It was, of course, heretofore possible to overcome this particular defect by inserting a buffer stage intermediate the oscillator and the center tap, thereby making the R.-F. path extending therebetween unidirectional. But this could be accomplished only at the expense of the added equipment required for the buffer stage.

When arranged in accordance with our inventive concept, on the other hand, the phase detector is prevented from acting as a discriminator, by providing an I.-F. bypass capacitor 30 between the center tap of the transformer secondary and ground. In general, the capacitance of the bypass capacitor 30 is preferably large compared to the distributed, interwinding capacitance 31. This arrangement is, of course, incompatible with injecting the oscillator signal at the same point, since condenser 30 would also bypass the latter signal. This problem has been solved by applying the oscillator signal to the cathodes of the phase detector diodes, rather than to the diode plates as disclosed in the above-identified copending application of Bradley and Tellier. In addition, it is quite evident that in our novel arrangement there is no possibility of any I.-F. input signal being coupled directly into the controlled oscillator, thereby eliminating any need for a buffer stage.

A feature of the circuit arrangement as illustrated and described in the hereinbefore-referred-to copending application of Bradley and Tellier resided in the provision of a low-pass filter arrangement which was inserted intermediate the phase detector and the control device and which was arranged to eliminate from the phase detector output all signals of frequencies higher than the audio range. The purpose of this filter was to prevent the occurrence of certain undesirable signals generated in the audio output of tube 16 in response to super-auditory variations in phase detector output. This feature is not only retained, but actually accentuated in our novel arrangement. Here the functions of the low-pass filter are carried out in part by the co-action of the conventional load resistors 32 and 33 with the I.-F. bypass condenser 29, their respective values being so chosen as to provide super-auditory attenuation, and in part by the two balanced R.-C. networks 34 and 35 which are, respectively, inserted at the plate of each phase detector diode. Their time-constants are chosen to be quite long, and they function to prevent sudden applications of impulse noise from charging up the input filter condenser 29, while rapid discharging thereof is aided by the presence of resistors 32 and 33.

In this connection, it should be pointed out that considerable care must be exercised in the actual design of the low-pass filter hereinbefore described, since the phase shift which is always associated with such filtering may result in causing the circuit to break into oscillation. While the particular values to be used in any specific case must, of course, be individually determined in accordance with well-known methods of circuit analysis, it may be said, in general, that the phase shift in the filter should not be in excess of ninety degrees if oscillations are to be avoided. For purposes of illustration a set of values is presented which have yielded satisfactory results in a practical circuit of this type used in connection with a receiver operating on the frequency modulation signals commercially employed for intelligence transmission at the present time. These typical values are 1200 micromicrofarads for I.-F. bypass and filter condenser 29, 47,000 ohms for each of output resistors 32 and 33, as well as for each of the resistors comprised in the R.-C. networks respectively designated by reference numerals 34 and 35, and 47 micromicrofarads for each of the condensers comprised in these aforementioned R.-C. networks.

It will be understood that the particular form of low-pass filter represented by the condenser 29 in accordance with resistors 32 and 33 does not constitute an essential feature of the invention, this arrangement being readily replaceable by other forms such as ladder type R.-C. or L.-C. low-pass filters, provided their presence does not introduce excessive phase shift in the sense hereinbefore discussed. In fact, the use of an actual low-pass filter may be altogether avoided by substituting, in its place, a high pass degenerative feedback circuit arranged, in essence, to feed an adjustable portion of the high audio frequency output of the system back to the signal output of phase detector 10 in the proper phase to cancel super-auditory variations in the phase detector output. This essential equivalence between low-pass filtering and high-pass feedback is well known in the art and such substitutions are therefore within the scope of our inventive concept.

While only one specific embodiment of our invention has been shown, it will be understood by those skilled in the art that many modifications thereof are possible within our inventive concept and we, therefore, desire this concept to be limited only by the scope of the appended claims.

We claim:

1. A circuit arrangement for detecting relative phase variations between a frequency-modulated carrier wave supplied by a first source and a frequency-modulated carrier wave supplied by a second source, said circuit arrangement comprising: a pair of current-rectifying elements each having an input and an output electrode, a load impedance connected to said output electrodes, means including a transformer for applying the wave from said first source to said input electrodes in push-pull relation, said transformer having primary and secondary windings between which there exists an appreciable distributed capacitance, a bypass capacitor connected between an intermediate point on said secondary winding and a point of fixed potential, and means for applying the carrier wave from said second source to said output electrodes cophasally.

2. The circuit arrangement claimed in claim 1, characterized in that the capacitance of said bypass capacitor is large compared to said distributed capacitance.

3. Apparatus for detecting the instantaneous phase difference between a pair of signals, said apparatus including: a pair of vacuum tubes, each comprising a cathode and an anode; first means for applying one of said signals in push-pull relation to similar electrodes of said pair of vacuum tubes, said first means comprising a transformer having primary and secondary windings, said one signal being applied to said primary winding and being thence applied to said secondary winding via the mutual inductive coupling therebetween, the ends of said secondary winding being connected, respectively, to similar electrodes of said pair of vacuum tubes, said secondary winding further having a center tap, said center tap being connected to ground by way of connecting means having low impedance for signals within the frequency range of said one signal; second means for applying the other of said signals cophasally to different similar electrodes of said pair of vacuum tubes; and means for deriving an output signal from said vacuum tubes, said last-named means comprising a load resistor connected intermediate one of said pairs of similar electrodes, said output signal being a function of the instantaneous phase difference between said pair of signals.

4. A system for detecting the instantaneous phase difference between a first and a second signal, emanating, respectively, from a first and second source, said system comprising a pair of unidirectionally conductive elements, each of said elements comprising at least a pair of electrodes; a transformer having a primary winding connected to said first source and having a center-tapped secondary winding, one end of said secondary winding being connected to one electrode of one of said elements, the other end of said secondary winding being connected to a similar electrode of the other of said elements, and the center tap of said secondary winding being bypassed to ground for signals within the frequency range of said first signal; a pair of paths, one of said paths coupling said second source to another electrode of said one of said elements and the other of said paths cophasally coupling said second source to a similar electrode of said other of said elements; and means for deriving, from said elements, an output which is a function of the instantaneous phase difference between said first and second signals, said last-named means comprising two parallel-connected impedances interconnecting said other similar electrodes, one of said impedances consisting of a pair of resistors of equal magnitude serially connected and coupled, at their junction, to said center tap, and the other of said impedances consisting of a capacitor.

5. A frequency modulation receiver comprising elements including: a system for detecting the instantaneous phase difference between a first signal derived from a first source and a second signal derived from a second source, said system comprising a pair of unidirectionally conductive elements, each of said elements comprising at least a pair of electrodes, a transformer having a primary winding connected to said first source and having a center-tapped secondary winding, one end of said secondary winding being connected to one electrode of one of said elements, the other end of said secondary winding being connected to a similar electrode of the other of said elements, and the center tap of said secondary winding being bypassed to ground for signals within the frequency range of said first signal, a pair of paths, one of said paths coupling said second source to another electrode of said one of said elements and the other of said paths coupling said second source to a similar electrode of said other of said elements, means for deriving, from said elements, an output which is a function of the instantaneous phase difference between said first and second signals, said last-named means comprising two parallel-connected impedances interconnecting said other similar electrodes, one of said impedances consisting of a pair of resistors of substantially equal magnitude serially connected and coupled, at their junction, to said center tap, and the other of said impedances consisting of a capacitor; a reactance control circuit coupled to said second source and adapted to control the frequency of the signals derived from said second source in accordance with a control signal; and means for applying said output to said reactance control circuit as a control signal.

6. Apparatus according to claim 5 characterized in that said first source comprises an input circuit of frequency-modulated carrier waves coupled to a carrier wave amplifier and further characterized in that said second source comprises an oscillator tuned approximately to the center frequency of said carrier waves.

7. A frequency-modulation receiver comprising elements including: a source of frequency-modulated carrier wave, said source having a pair of output terminals; a carrier wave transformer having at least a primary and a secondary winding, said primary winding being connected between said pair of output terminals, said secondary winding being provided with a center tap and said center tap being grounded for waves within the frequency range of said frequency-modulated carrier waves; a balanced phase detector comprising a pair of diodes and having a pair of input circuits, said secondary winding comprising one of said input circuits and being connected between one pair of similar electrodes of said pair of diodes and arranged to apply said carrier waves to said phase detector via the inductive coupling between said primary and secondary windings; an oscillator constructed and arranged to generate oscillations at approximately the center frequency of said carrier waves; means for applying said oscillations to the other of said pair of input circuits, said other input circuits comprising the parallel combination of the other pair of similar electrodes of said diodes, the output of said phase detector being a function of the instantaneous phase difference between said oscillations and said frequency-modulated carrier waves; a reactance control circuit coupled to said oscillator, said reactance control circuit being adapted to control the frequency of the generated oscillations in accordance with the control signal; and means for applying the output of said phase detector to said reactance control circuit as a control signal.

JOSEPH C. TELLIER.
ALBERT R. ALTER.

REFERENCES CITED

The following references are of record in the file of this patent:

UNITED STATES PATENTS

| Number | Name | Date |
|---|---|---|
| 2,141,338 | Barton | Dec. 27, 1938 |
| 2,332,540 | Travis | Oct. 26, 1943 |
| 2,376,126 | Crosby | May 15, 1945 |
| 2,462,759 | McCoy | Feb. 22, 1949 |
| 2,464,818 | Learned | Mar. 22, 1949 |